Sept. 10, 1940.    S. HELLER    2,214,299
APPARATUS FOR INVESTIGATING HEART ACTION
Filed April 3, 1936    4 Sheets-Sheet 1
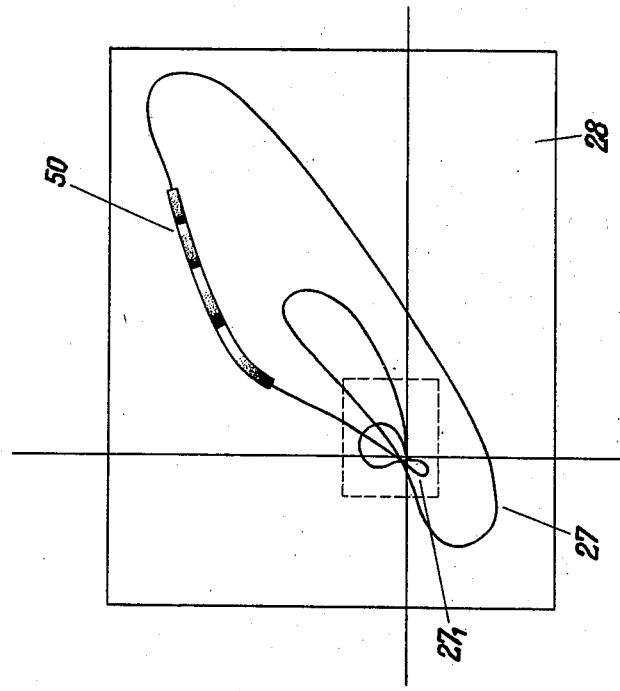
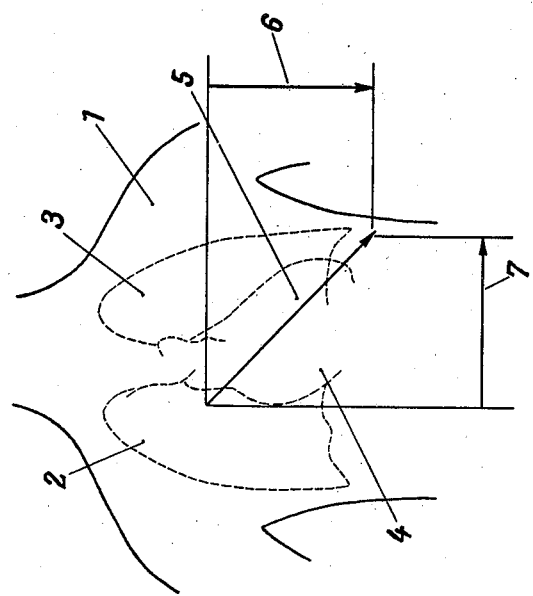
Inventor:
Siegfried Heller

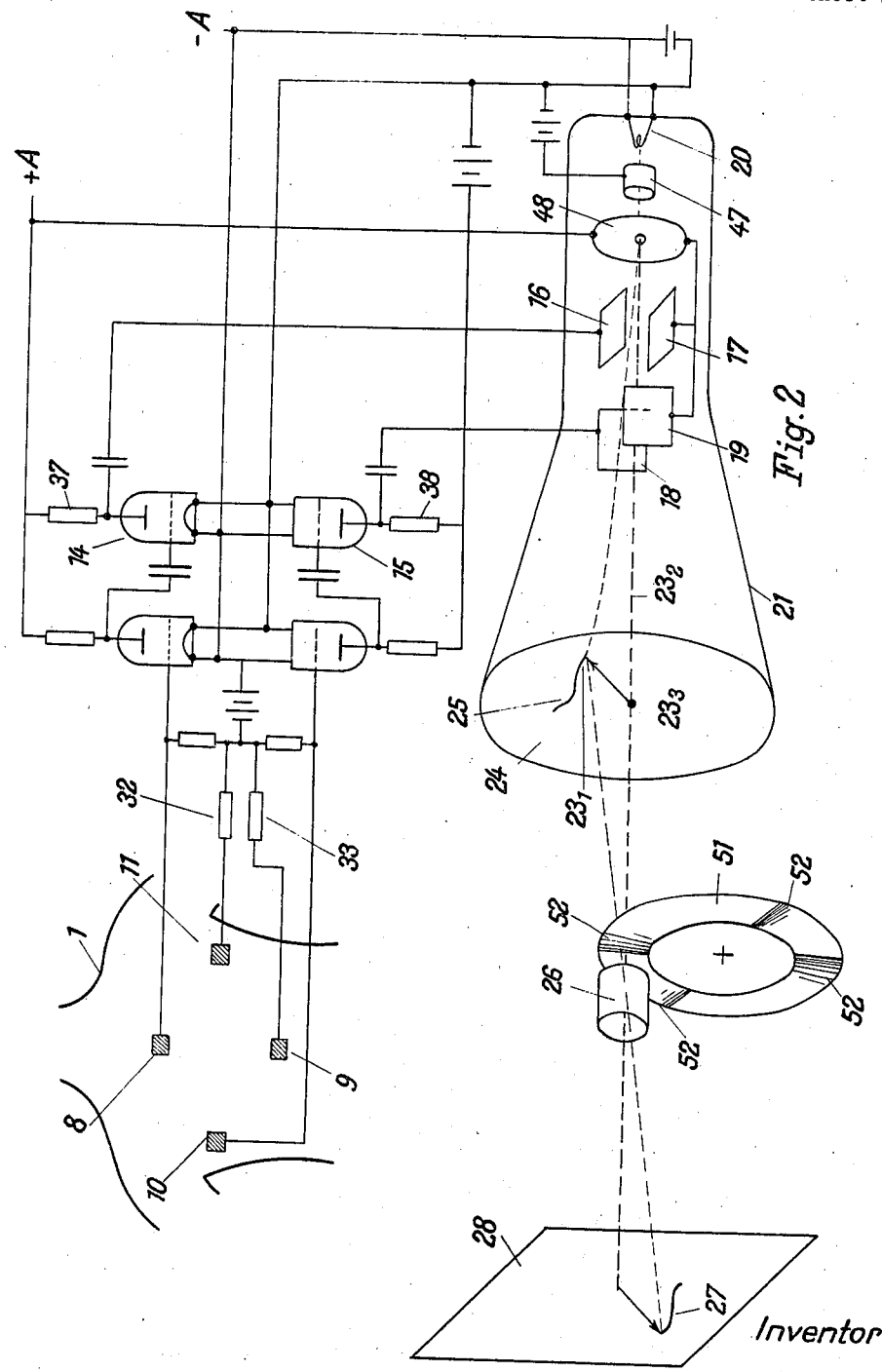

Sept. 10, 1940.    S. HELLER    2,214,299
APPARATUS FOR INVESTIGATING HEART ACTION
Filed April 3, 1936    4 Sheets-Sheet 3

Inventor:
Siegfried Heller

Sept. 10, 1940. S. HELLER 2,214,299
APPARATUS FOR INVESTIGATING HEART ACTION
Filed April 3, 1936 4 Sheets-Sheet 4
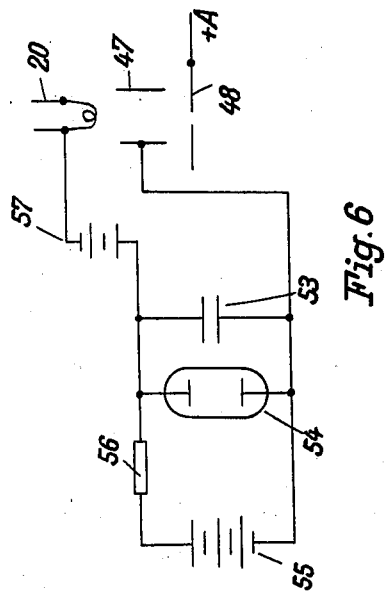
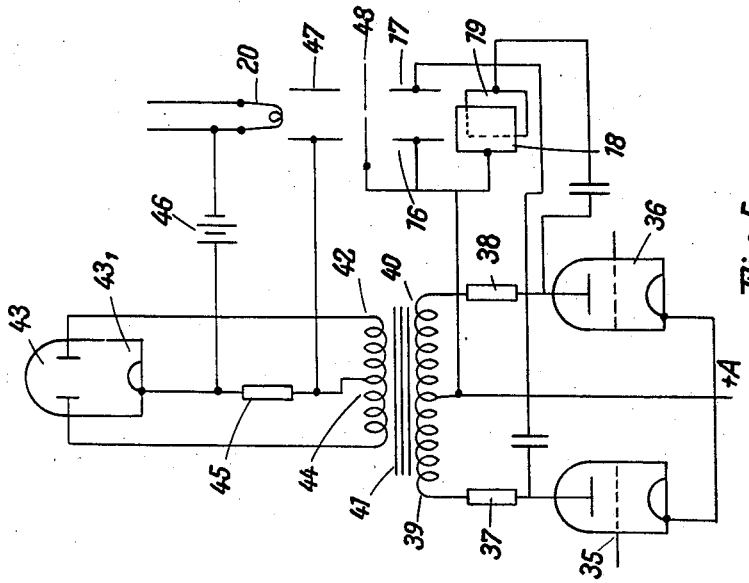
Inventor:
Siegfried Heller Patented Sept. 10, 1940

2,214,299

UNITED STATES PATENT OFFICE 2,214,299

APPARATUS FOR INVESTIGATING HEART ACTION

Siegfried Heller, Berlin-Lichterfelde, Germany

Application April 3, 1936, Serial No. 72,633
In Germany April 11, 1935

4 Claims. (Cl. 128—2.05)

This invention relates to a method of and apparatus for investigating temporarily variable electrical fields. Variable electrical fields of the character referred to occur for example in the neighborhood of electrical railway tracks due to stray currents. Stray currents often produce disturbances in other lines underground, for example in gas lines. The determination of the cost of electrical fields produced underground by stray currents is therefore of considerable importance in many cases, for example when it is necessary to provide remedies for damage that has been caused or where it is necessary to render a decision in lawsuits caused by such damage.

Another example of variable electrical fields, the investigation of which as to their duration is of great importance consists of the electrical fields which are produced in human or animal bodies by the action of the heart. The duration and course of the changes of the heart potential field permits conclusions to be arrived at as regards the constitution of the heart and are used for the investigation of pathological changes of the heart. Variable electrical fields occur in innumerable other cases from all of which, including those previously specifically referred to, important conclusions may be drawn with the aid of the present invention.

Variable electrical potential fields have heretofore been investigated by means of suitable probes or electrodes by means of which the voltages were taken at different points, the differences in tension occurring between any two probes or electrodes being recorded in respect to their duration. In this manner certain separate components of the electrical field are obtained. The desired general survey as regards the course of the field itself has been attempted to be drawn from a comparison of simultaneously recorded components. In this operation it is of great importance to take into consideration those points of the curves showing the course of the components, which points are simultaneous. This is not always possible with the accuracy required, particularly when one or the other of the recorded components shows voltage peaks, as in such cases a very slight error in time in the coordination of the corresponding points of two component curves can lead to considerable errors, because such a voltage peak in the curve in question generally will show an exceedingly steep rise. Furthermore, judging two or more curves simultaneously in the correct coordination in respect to time calls for a large experience which can only be acquired from long practice.

All of these disadvantages are overcome by the present invention which is distinguished from those heretofore used for the same purpose by the fact that the temporary course of the resulting potential gradient vector itself is directly reproduced as to size and direction in the form of a polar diagram. A polar diagram has the advantage that it enables the size and direction of the vector to be recognized directly at all times, that is to say precisely those magnitudes which in the last analysis are decisive in the investigation of variable electrical fields. By the present invention, therefore, errors are reduced to a minimum and quite irrespective of the fact of whether the voltage field shows a very brief maximum or minimum at any time in a particular direction. The polar diagram produced by the present invention enables these particularly important parts to be very readily recognized, whereby much more exact conclusions as regards the field exciter can be drawn, whereas for the reasons given the interpretation of records made with devices heretofore used were subject to considerable inaccuracies.

Various measuring instruments may be used in my novel apparatus for making the polar diagram, providing the indicating means is capable of executing a bi-dimensional movement. The investigation of a variable electrical field may be made in accordance with my invention by drawing the projection of the spatial vector diagram upon at least two planes disposed as the particular case may require either at right angles or at an acute angle to each other. Preferably, however, the course in space of the vector would be shown in a single diagram. This may be accomplished in various manners within the spirit of the present invention, for example by using any suitable photographic registering device to record the projected vector diagram upon a suitable plane, means being provided whereby the intensity of the spot of light can be controlled in accordance with the distance of the point of the vector from the plane upon which the projection was made. In using such an illustrative embodiment of the invention the indicating means of the photographic registering device will be controlled by two components, for example at right angles to each other, in the plane upon which the projection is made, while the intensity of the light beam making the record is controlled by a third component of the potential field at right angles to said plane. Or in accordance with a modification of the invention two vector diagrams may be recorded successively, the electrodes or probes being applied at points spaced from each other in the field to be investigated. Or by using two apparatuses embodying the present invention or providing said apparatus with two recording devices and simultaneously recording two vector diagrams by means of electrodes or probes spaced from each other. In this manner two vector diagrams will be produced which will stand in the same relation to each other as would stereoscopic pictures of a diagram, in which case by looking at the two diagrams through a stereoscope it is possible to obtain a general and good view of the course of the polar diagram in space.

Means will preferably be provided in accordance with the invention whereby the direction of rotation of the vector and the variation in speed of the potential field can be directly observed from the diagram obtained. This is very advantageous in many applications of the invention, and when photographic recording means is used can be realized by the provision of means whereby the intensity of the recording light ray can be changed periodically. Light nodes are thus produced on the diagram, the spacing of which from one another shows directly the speed with which the potential field changes. If the arrangement be such that said intensity increases quickly and slowly dies away, or so that said intensity gradually increases but quickly dies away, the diagram will appear divided into gradually weaker or stronger appearing parts which thus show conclusively in which direction the diagram is traversed at each point by the vector peak.

A conventional Braun tube will preferably be used in carrying out the invention for recording the diagram, and in which the electron ray can be deflected by two pairs of deflecting means, for example two pairs of deflecting plates in two separate planes. The Braun tube used in television is particularly adapted for this purpose, said tube being provided with means for controlling the intensity of the light ray and therefore the intensity of the fluorescence spot. The control of the fluorescence spot is advantageous for reasons hereinafter more fully explained. The Braun tube has the great advantage that even the most rapid changes in the potential differences applied to the deflection plates are transmitted instantaneously, that is to say without inertia, to the light ray through the instrumentality of which the indicating and recording are effected. Variations in the potential field being investigated will therefore be reproduced practically without delay in their minutest detail.

When using a Braun tube the arrangement and connections will preferably be as follows: Two pairs of electrodes or probes, applied to suitably selected points of the space or the body in which the field to be investigated occurs, are connected to the grids of two amplifier cascades and the reinforced voltages are connected to the two pairs of deflection plates of the Braun tube. The light ray of said tube will then be deflected in two different planes according to the potential differences in the plates of each pair of deflection plates, so that the fluorescence spot appearing on the screen will traverse the vector diagram. The vector will therefore always, one might say automatically, combine from the components of the voltage field taken up by the electrodes or probe pairs. The size and direction of the vector is in each case determined by the line connecting the point of rest of the fluorescence spot with the corresponding point of the diagram. Preferably means will be provided in accordance with the invention for picturing the fluorescence screen photographically upon a light sensitive layer. If the electrodes or probes be applied to the field which is to be investigated, the vector diagram will be recorded and this record at once enables the course of the projection of the resulting vector of the voltage field being investigated, upon the plane which is determined by the two components taken off by the pairs of electrodes or probes, to be surveyed at a single glance; and this with much more accuracy than would be possible where the course of a plurality of components in rectangular coordinates are recorded with devices heretofore used, and the survey of the course of the voltage field must be obtained by observing simultaneously the records of the separate components.

In the case of photographic recording of the vector diagram the point where the fluorescence spot is depicted, which point makes the record, follows its path with varying speed, which is dependent not only upon the angular speed of the vector but also upon its absolute magnitude. As a result the recorded diagram will appear very black in those parts where the vector is small. Parts of the vector diagram which may be of great importance to the investigation may thus appear blotted on the picture and fine, often important details may be discerned only with difficulty or not at all. This objection may be overcome by the present invention by the simple provision of means to control the intensity of the recording luminous spot in accordance with the speed with which said spot moves over the light sensitive layer. A diagram picture of equal blackness in all its parts can thus be obtained and all the details of which remain readily discernible and interpretable and thus furnish an exceedingly favorable basis for the particular investigation in hand. Where a Braun tube is used this control of the intensity of the recording light spot may be effected by the means for controlling the intensity of the fluorescence spot. An arrangement particularly suited for this purpose is that by which the intensity of the light ray is controlled correspondingly to the absolute value of the changes of the deflection voltages relatively to the unit of time. This may be provided for by simply connecting extra high resistances to the last boosting steps of the two cascade primary windings of a transformer. The conductors leading to the pairs of deflection plates are each connected through a condenser to a point preceding said resistances. The common secondary winding of the transformer will preferably be connected to a suitable rectifier. The incandescent cathode of said rectifier will be connected through a resistance to the central plug of the secondary winding. The above arrangement operates as follows: The rectifier produces a drop in the voltage at the ends of the resistance, said drop, owing to said rectifying action, being proportionally equal to the absolute value of the variation, per time unit, in the voltages withdrawn from the amplifiers, that is to say equal to the absolute value of the speed of variation in the deflection voltage. If, therefore, the intensity of the light ray of the Braun tube be controlled according to the drop in voltage at the last-mentioned resistance of said rectifier, then the intensity of the fluorescence spot will in fact be substantially proportionally equal to the speed of movement over the fluorescence screen.

In the vector diagram obtained by the present invention some parts may appear relatively large while other parts which are characterized by relatively low voltage are depicted on a very small scale. The latter parts, however, may be precisely those that are of particular interest in the case in hand. Means will therefore be provided, in accordance with the present invention, whereby certain parts of the vector diagram may be enlarged to the same degree and with angular exactitude. In the illustrative embodiment of the invention this may be accomplished by providing switches which enable the amplifying figures for all components of the potential field to be varied in a proportionally equal manner. This may be conveniently accomplished by the use of fixed potentiometer connections, adjustable in common by a separate switch.

The shape of the vector diagram will naturally suffer a distortion corresponding to the ratio of the changes in the reinforcement of the separate component. Such distortions, particularly when they vary from diagram to diagram, increase the difficulty of accurately reading or interpreting the recorded diagram. Suitable means are according provided to overcome this difficulty, said means herein conveniently and illustratively comprising a calibration varying voltage which may be connected with phase-coincidence through both amplifiers to the deflection plates of the Braun tube or other suitable indicating or recording means by a suitable switch. In such case the fluorescence spot of the Braun tube or equivalent means describes a touch or line the inclination of which is determined by the ratio of the degree of reinforcement of the two amplifier cascades, while the length of said line, the ratio being known, furnishes a means of judging of the absolute degrees of reinforcement. By means of the adjusting means provided for the reinforcing degrees of the separate cascades, the two degrees of reinforcement may be adjusted to the same degree or at any other desired ratio before making the diagram.

The invention and its aims and objects will be readily understood from the following description of a mode and manner of practising said invention and of illustrative apparatus for that purpose, taken in connection with the accompanying drawings, the true scope of the invention being pointed out in the appended claims.

In the drawings,

Fig. 1 shows diagrammatically the outline of a human body and the position of the heart and direction of the voltage field vector at a particular moment.

Fig. 2 shows diagrammatically one illustrative embodiment of my novel apparatus comprising a Braun tube.

Fig. 5 shows diagrammatically a supplementary arrangement for controlling the intensity of the light ray for obtaining a diagram of equal blackness throughout all its parts, when the said diagram is recorded photographically.

Fig. 6 shows diagrammatically another illustrative arrangement for producing periodic variations in the intensity of the light ray for the purpose of rendering simultaneously recognizable both the speed and the direction of rotation of the vector in all parts of the diagram.

Fig. 7 shows an illustrative vector diagram recorded by my invention.

Figures 3, 4:
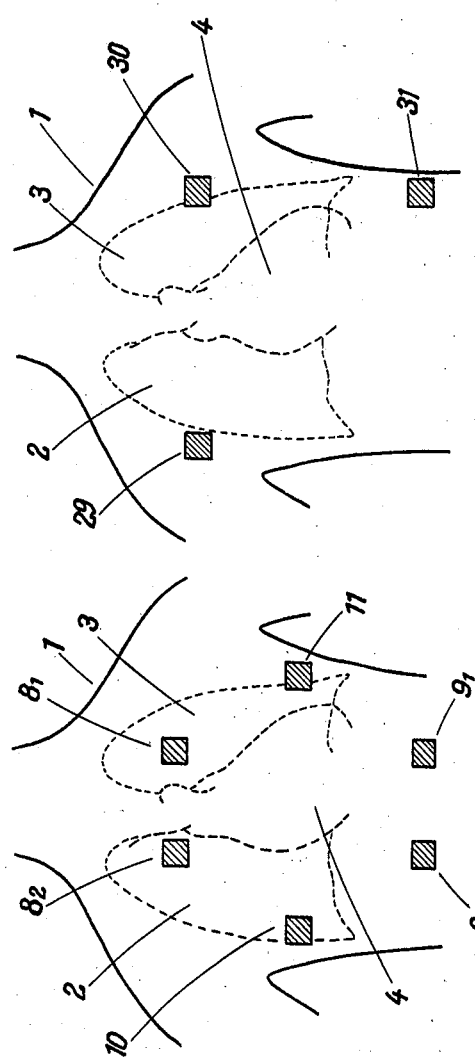
Figs. 3 and 4 illustrate diagrammatically how the electrodes are preferably applied to the body in order to obtain from the latter components of the heart potential field.

In all of the drawings all parts unnecessary to the understanding of the invention have been omitted for the sake of clearness.

It will be noted that while herein the invention has been illustratively shown and described in embodiments more particularly adapted for the investigation of potential fields produced in the human body by the heart action, said invention is equally adapted for the investigation of other electrical fields such for example as those occurring in the earth due to stray electrical currents, in the latter case it being simply necessary for example, or at least preferable, to substitute probes in place of the electrodes, said probes being sunk in the soil.

Referring to Fig. 1, the reference numeral 1 designates the partial outline of a human body in which the lobes of the lung are indicated by 2 and 3, respectively, and the heart outline by 4. By the contraction and dilatation of the heart muscle there is produced a variable electrical field, the resulting vector of which at a specified moment being indicated by an arrow 5.

With apparatus heretofore used one had to be content with representing the course of separate components 6 and 7 only of the vector. For this purpose three electrodes were applied to the body, for example to the right and left arm and to the left leg and the differences in potential engendered at any two of said electrodes were then either simultaneously or successively recorded with corresponding reinforcement, by oscillographs of usual construction. Applicant's invention, on the contrary, does not record the separate component separately but records the course of the resulting vector in a vector diagram.

As illustrated diagrammatically in Fig. 2, two components of the heart potential field which are at right angles to each other are obtained by the application of two pairs of electrodes 8, 9 and 10, 11, respectively, to the body 1. These components are conveyed through two amplifying cascades 14 and 15 to the deflecting plates 16, 17 and 18, 19, respectively, of a Braun tube 21 of conventional construction. The light ray 23 from said tube projects the fluorescence spot 23₁ onto the fluorescence screen 24. The light ray will be deflected from its median position 23₂ in two directions at right angles to each other by the electrical fields produced between the pairs of plates 16, 17 and 18, 19, respectively, by the heart potential field. The deflection in one direction produced by the field between the plates 16 and 17 is determined by the component obtained through the pair of electrodes 8 and 9, while the deflection in the other direction, perpendicular to said first direction and determined by the field between the plates 18 and 19 is caused by the component of the heart potential field obtained through the pair of electrodes 10, 11. The line connecting the fluorescence spot 23₁ with the point 23₃ at which the undeflected electron ray 23₂ strikes the fluorescence screen 24, therefore represents, both in size and direction, the projection of the resulting vector upon the plane determined by the pairs of electrodes 8, 9 and 10, 11, respectively. Said fluorescence spot 23₁ therefore describes upon said screen 24, a curve 25 which represents the projection upon the plane determined by the pairs of electrodes 8, 9 and 10, 11, respectively, of the resulting vector of the heart potential. By the use of a camera lens 26, the curve 25 may be pictured upon a light sensitive layer 28 upon which the curve 27 will be obtained as a picture of the vector diagram. As illustratively shown in Fig. 3, three electrodes 29, 30, and 31 may be used instead of two pairs of electrodes 8, 9 and 10, 11, to obtain the components of the heart potential field, the difference in potential between 29 and 30 being applied to one amplifier cascade while the difference in potential between 30 and 31 will be applied to the other amplifier cascade.

Fig. 4 illustrates how in accordance with the invention a survey of the course of the vector diagram in space can be obtained. For this purpose one pair of electrodes 10, 11 is applied to the body as explained with reference to Fig. 2, while the second pair of electrodes will be applied to the body in two different positions, once at $8_1$, $9_1$ and then at $8_2$, $9_2$, at a point spaced a certain distance from the first application in a direction parallel to the latter. Two successive exposures are then made either with the same apparatus or with two apparatus, or two exposures may be made simultaneously with an apparatus in accordance with the invention having two recording devices. Two vector diagrams are thus obtained which differ from each other like two stereoscopic exposures. If these be observed through a stereoscope or measured in a stereo-comparing apparatus an exact survey of the course in space of the resulting vector will be obtained.

As illustrated in Fig. 2, the incandescent cathodes of the two amplifying cascades are connected to a common pole for convenience to which the electrode 9 or 11 of the two pairs of electrodes, respectively, is to be connected. In order to avoid short circuiting said electrodes the latter should be connected through relatively high resistances 32, 33, preferably of equal strength. Resistances of about 20,000 ohms will serve the purpose.

It is not essential that the two pairs of electrodes be applied at right angles to each other as illusted. For many purposes it may be preferable to use an oblique angled coordinate system. In order, however, to obtain an accurate angled representation of the vector diagram when oblique angled electrodes are used, it is necessary that the pairs of deflection plates of the Braun tube or other equivalent means of said tube be also correspondingly inclined to each other, so that the deflection of the electron ray shall be effected by the two pairs of deflection means in planes respectively which are inclined to each other at the same angle as the angle of inclination of the pair of electrodes relatively to each other.

The vector diagram of the pulsation or beat of a normal heart is shaped as shown in Fig. 7. From this diagram it will be seen that the fluorescence spot $23_1$ or the light spot which makes the image upon the light sensitive layer 28 traverses different portions of the diagram at quite different speeds. Those portions where the speed is lower, for example the narrow loop $27_1$, would be much blacker than other portions of the diagram at which the speed is high. Certain portions of the diagram would thus be blotted so as to be unrecognizable while other portions would be depicted very lightly. Means are accordingly provided whereby the intensity of the depicting light beam or spot is controlled according to its speed of travel, in such manner, that its intensity increases with its increased speed of travel and diminishes with a decrease in said speed. Any suitable means may be provided for this purpose within the scope of the invention, said means herein comprising the illustrative arrangement shown in Fig. 5. Referring to said figure, the electrodes and the deflection plates of the Braun tube may be connected through the amplifying cascades in the same manner shown in Fig. 2. To the two last steps 35, 36 of the amplifying cascades 14, 15 are connected the primary windings 39, 40 of a transformer 41, through resistances 37, 38. A secondary winding 42 is coupled to said primary windings and to said secondary winding is connected a suitable rectifier 43. The incandescent cathode $43_1$ of said rectifier is connected to the center convolution 44 of the transformer through a resistance 45. Both ends of said resistance 45 are preferably connected through a voltage element 46 with the incandescent cathode 20 and with intensity controlling means such as a Wehnelt cylinder 47 of the Braun tube, the anode 48 of which and the deflection plates 16, 17 and 18, 19 of which are indicated in said figure.

This arrangement operates as follows: As the primary windings 39, 40 are connected in series with the resistances 37, 38, current changes occur in the windings 39, 40 which are proportionally equal to the voltage variations conveyed to the deflection plates. Consequently the speed of variation of the strength of the current in the primary windings 39, 40 will also be proportionally equal to the changes in speed of the voltages at the deflection plates. As a result variations in voltage will be induced in the secondary winding 42, the speeds of variations of which are proportionally equal to the speeds of variations in the strength of the current in the primary windings 39, 40. A rectified current therefore flows from the cathode $43_1$ of the rectifier 43, through the resistance 45 to the median convolution 44 of the secondary winding 42, said current creating continuous voltage fluctuations at the ends of said resistance 45. These continuous voltage fluctuations are therefore in absolute value equal to the variations in voltage per time unit in the deflection plates 16, 17 and 18, 19, respectively. Consequently there are conveyed to the Wehnelt cylinder 47 continuous voltage changes which in absolute value are proportionally equal to the speed of variation of the voltages at the deflection plates and consequently proportionally equal to the speed of travel of the fluorescence spot. The intensity of the electron ray and consequently the intensity of the fluorescence spot are, however, proportionally equal to the voltage of said Wehnelt cylinder, so that by the arrangement described the intensity of the fluorescence spot and as a result the intensity of the light spot which produces the image on the light sensitive layer 28 is substantially proportionally equal to its speed of travel. By the arrangement described the speeds of variation of the two components are added arithmetically. Strict proportional equality between the intensity and the speed of travel of the fluorescence spot would require not an arithmetical sum but a vector sum. Such a sum can be obtained as is well known by the use of crossed coils. For all practical purposes, however, the approximate solution obtainable by the simple arrangement above described suffices.

The last described arrangement by which the marking of the vector diagram is substantially equally black throughout permits of a further development whereby a very simple representation of the course of the vector in space can be secured by taking off from the body a third component perpendicularly to the plane containing the two components of the heart potential field taken off from the body for controlling the electron ray and by adding to the control of the intensity of the electron ray a further intensity control which is proportionally equal to said third component. The blackness of the diagram curve thus varies according to the magnitude of said third component, so that by said blackness of the diagram curve the position of the vector peak perpendicularly to the diagram plane at all points can be recognized and estimated by photometric measurement.

Means are also preferably provided to indicate on the diagram the direction of rotation as also the speed of rotation of the vector at all points of the diagram. Any suitable means may be provided for this purpose within the scope of the invention, the means herein used accomplishing the object by periodically varying the intensity of the light spot which makes the picture, for example by suddenly increasing said intensity. In this way light nodes appear upon the curve diagram the spacing of which from each other taken in connection with the frequency give the speed of rotation or angular speed of the vector. If the variation in intensity be produced suddenly and then allowed to fade away gradually, or vice versa, an image will be produced such as is shown at 50 in the curve 27 of Fig. 7. The wedge-shaped black marks permit the direction of travel of the vector at each point to be immediately recognized. Any suitable means may be provided within the spirit of the invention for producing such a periodic variation of the intensity of the illumination. In the illustrative embodiment of the invention shown in Fig. 2, one illustrative form of means for this purpose is shown. Said means comprises a rotating disk 51 which is transparent and provided with black wedge-shaped portions 52 and which is inserted in the path of the light ray which makes the image upon the light sensitive layer 28. It will be apparent that in the rotation of said disk as the maximum blackness of the wedges 52 pass through the path of the ray a sudden strong diminution in the projected light of the rays will occur which will gradually fade away in the further rotation of said disk 51, thus producing a picture as shown at 50 in Fig. 7.

The same result may be obtained by periodically varying the intensity of the light ray, for example by suddenly weakening said intensity and then gradually increasing it again or vice versa. Any suitable means may be provided for this purpose without departing from the spirit of the invention. One illustrative form of means which may be used for this purpose is shown in Fig. 6. Said means comprises a glow lamp 54 connected in parallel with a condenser 53 to the source of electrical energy 55 through a resistance 56. The condenser voltage will preferably be conveyed through a voltage element 57 to the incandescent cathode 20 of the Braun tube and to a suitable device for controlling the intensity of the light ray, for example a Wehnelt cathode 47. The battery 55, through the resistance 56, gradually loads the condenser 53. As soon as the voltage of the condenser reaches the firing voltage of said glow lamp 54, said condenser unloads through said lamp. While, therefore, the unloading of the condenser through said lamp occurs suddenly, the condenser will be gradually loaded by the operation of the resistance 56. The voltage of the Wehnelt cylinder therefore suddenly drops and thereafter gradually rises again. As a result the intensity of the light ray and therefore the intensity of the light spot which makes the picture drop suddenly and then slowly increases, or vice versa, according as the poles of said condenser are connected to the incandescent cathode 20 and the Wehnelt cylinder 47. Instead of connecting said condenser 53 to the incandescent cathode and Wehnelt cylinder of the electron 2, it may be connected to a Kerr cell which is positioned in the path of said ray which projects the image of the fluorescence spot upon the light sensitive layer 28. Said cell then also produces a sudden variation in the light intensity followed by a gradual fading out. The period at which the sudden variations in intensity, as also the sudden changes in backness in the depicted diagram follow each other, is dependent upon the number of rotations of the rotating disk 51 or on the period in which the condenser 53 discharges through said glow lamp 54. In the first case said period may be adjusted by adjustment of the number of rotations of the disk 51, in the second place said period depends upon the capacity of the condenser 53, the height of the ignition voltage of the tube 54 and the magnitude of the resistance 56. In this case also said period can therefore be determined or arbitrarily adjusted, so that the speed of travel of the vector is readily recognizable from the recorded diagram.

To make a complete diagnosis of the heart it is often desirable to compare the course of the cardiac sound with the course of the heart potential field. The present invention is readily adaptable in such manner that the diagram produced will immediately make it possible to recognize the relation between the course of the cardiac sound and the course of the heart potential field. Instead of recording by means of an oscillograph the cardiac tone which has been received in a microphone and conveyed by an amplifier to said oscillograph, means quite similar to those above described may be provided within the scope of the present invention, by which the cardiac sound received by the microphone is made to control the intensity of the light spot by which the image is produced. While the diagram itself shows the course of the heart potential field, the course of the blackening of the diagram curve discloses the course of the cardiac sound in direct relation to the course of said potential field. It is assumed of course that in the first instance the intensity is controlled in accordance with the speed, to which control that in accordance with the cardiac sound is added. As a simultaneous marking of the speed of travel and direction of travel of the vector by means of the periodic variation in the intensity of the blackening of the diagram curve, with a representation of the cardiac sound, also by means of variations in the intensity of the blackening, would in many cases result in a picture that would not be easily intelligible, it is preferable to provide a switch adapted to make possible the recording of the diagram with the cardiac sound added and alternatively the recording of the diagram with the speed of travel and direction of travel added.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

I claim:

1. Apparatus for investigating variations in the electrical field created by the human or animal heart action comprising a plurality of tapping electrodes for application to different points of the body of the patient, for tapping at least two potential differences between two pairs of points; a cathode ray tube and a fluorescence screen, said tube including two pairs of deflecting electrodes; valve amplifiers through which the potential differences tapped by said tapping electrodes are conveyed to said deflecting electrodes, so that the fluorescence spot projected by said tube upon said screen is deflected from its position of rest upon said screen, the line connecting said position of rest with the position of said spot at any time, representing both as to size and direction, the vector whose components equal the potential differences at said pairs of tapping electrodes, said spot thus describing upon said screen a curve, the radius vector of which, measured from the position of said spot before its deflection, reproduces at all times, both as to size and direction, the projection of the potential gradient vector upon the plane containing said pairs of tapping electrodes, and means to make a photographic record of the vector diagram indicated upon said screen by said fluorescence spot, said means including a light sensitive layer, a transparent rotary disc provided with spaced wedge shaped darkened portions, and located in the path of the light ray of said cathode ray tube, in front of said light sensitive layer, whereby the ray from said cathode ray tube will be periodically darkened and lightened.

2. Apparatus for investigating variations in the electrical field created by the human or animay heart action comprising a plurality of tapping electrodes for application to different points of the body of the patient, for tapping at least two potential differences between two pairs of points; a cathode ray tube and a fluorescence screen, said tube including two pairs of deflecting electrodes; valve amplifiers through which the potential differences tapped by said tapping electrodes are conveyed to said deflecting electrodes, so that the fluorescence spot projected by said tube upon said screen is deflected from its position of rest upon said screen, the line connecting said position of rest with the position of said spot at any time, representing both as to size and direction, the vector whose components equal the potential differences at said pairs of tapping electrodes, said spot thus describing upon said screen a curve, the radius vector of which, measured from the position of said spot before its deflection, reproduces at all times, both as to size and direction, the projection of the potential gradient vector upon the plane containing said pairs of tapping electrodes; and means to make a photographic record of the vector diagram indicated upon said screen by said fluorescence spot, said means including a light sensitive layer, a Kerr cell located in the path of the light ray of said cathode ray tube and in front of said light sensitive layer, and means periodically to increase and decrease the voltage of said cell whereby the ray from said cathode ray tube will be periodically darkened and lightened.

3. Apparatus for investigating variations in the electrical field created by the human or animal heart action comprising a plurality of tapping electrodes for application to different points of the body of the patient, for tapping at least two potential differences between two pairs of points; a cathode ray tube and a fluorescence screen, said tube including two pairs of deflecting electrodes; valve amplifiers through which the potential differences tapped by said tapping electrodes are conveyed to said deflecting electrodes, so that the fluorescence spot projected by said tube upon said screen is deflected from its position of rest upon said screen, the line connecting said position of rest with the position of said spot at any time, representing both as to size and direction, the vector whose components equal the potential differences at said pairs of tapping electrodes, said spot thus describing upon said screen a curve, the radius vector of which, measured from the position of said spot before its deflection, reproduces at all times, both as to size and direction, the projection of the potential gradient vector upon the plane containing said pairs of tapping electrodes; and means to make a photographic record of the vector diagram indicated upon said screen by said fluorescence spot, said means including a light sensitive layer, a Kerr cell in the path of the light ray of said cathode tube and in front of said light-sensitive layer, and means comprising a condenser to increase and diminish the voltage of said cell; a source of voltage to load said condenser; a glow lamp connected in parallel with said condenser; and a resistance through which said incandescent lamp is connected to said source of voltage.

4. Electrocardiographic method of examining the heart, comprising applying the electrodes to at least one pair of points of the patient's body to obtain at least one potential difference; making a plane vector diagram corresponding to said position of the electrodes; repeating this operation by applying said electrodes to a second pair of points of the body; making a second plane vector diagram corresponding to this second position of said electrodes; and combining said two plane vector diagrams to form a stereoscopic vector diagram.

SIEGFRIED HELLER.